(12) United States Patent
Kwon et al.

(10) Patent No.: US 8,334,839 B2
(45) Date of Patent: Dec. 18, 2012

(54) REMOTE CONTROL SYSTEM INCLUDING A DISPLAY PANEL AND A TERMINAL FOR REMOTE-CONTROLLING THE DISPLAY PANEL, AND REMOTE CONTROL METHOD IN THE REMOTE CONTROL SYSTEM

(75) Inventors: Hyuk-Choon Kwon, Seoul (KR); Eun-Tae Won, Seoul (KR); Do-Young Kim, Yongin-si (KR); Tae-Han Bae, Seongnam-si (KR); Jae-Seung Son, Suwon-si (KR); Dong-Seek Park, Yongin-si (KR); Chi-Hong Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 548 days.

(21) Appl. No.: 12/553,539

(22) Filed: Sep. 3, 2009

(65) Prior Publication Data

US 2010/0053079 A1 Mar. 4, 2010

(30) Foreign Application Priority Data

Sep. 4, 2008 (KR) .................. 10-2008-0087353

(51) Int. Cl.
*G09G 3/30* (2006.01)
(52) U.S. Cl. .......................... 345/156; 700/83; 345/158
(58) Field of Classification Search ........................ None
See application file for complete search history.

(56) References Cited

U.S. PATENT DOCUMENTS

2007/0176899 A1* 8/2007 Yoo et al. ...................... 345/158
2008/0188959 A1* 8/2008 Kneissler ........................ 700/83

* cited by examiner

*Primary Examiner* — Joseph Haley
(74) *Attorney, Agent, or Firm* — The Farrell Law Firm, P.C.

(57) ABSTRACT

Disclosed are a remote control method in a remote control system including a display panel, and a terminal for remote-controlling the display panel, and the remote control system. The remote control system includes a terminal for transmitting a light signal to a point on the screen of a display panel according to user input, and a display panel for executing an operation corresponding to the light signal received point.

20 Claims, 4 Drawing Sheets

REMOTE CONTROL SYSTEM INCLUDING A DISPLAY PANEL AND A TERMINAL FOR REMOTE-CONTROLLING THE DISPLAY PANEL, AND REMOTE CONTROL METHOD IN THE REMOTE CONTROL SYSTEM

PRIORITY

This application claims priority under 35 U.S.C. §119(a) to an application entitled "Remote Control System Including A Display Panel And A Terminal For Remote-Controlling The Display Panel, And Remote Control Method In The Remote Control System" filed in the Korean Industrial Property Office on Sep. 4, 2008 and assigned Serial No. 10-2008-0087353, the contents of which are incorporated herein by reference.

BACKGROUND OF THE INVENTION

1. Field of the Invention

The present invention relates generally to a remote control system, and more particularly, to a remote control method in the remote control system including a display panel and a terminal for remote-controlling the display panel.

2. Description of the Related Art

In touch screen technology, functions can be activated and commands can be input by directly touching a display screen, otherwise known as a touch screen. Such a touch screen is used for display purposes in a compact portable device, such as a mobile communication terminal or a Personal Digital Assistant (PDA). Various types of touch screen technologies exist, including resistive overlay, scanning infrared, capacitive overlay and surface acoustic wave. The portable devices employing a touch screen through the above-mentioned touch screen technologies receive a command, such as user input, through the touch screen.

However, the above-mentioned technologies allow input to be sensed only when the user physically touches or precisely approaches the touch screen. A resistive overlay touch screen can be operated only when there is physical contact; as such, the surface of the touch screen may be damaged after repeated use. In order to operate a capacitive overlay touch screen, touching by an input means that can cause the change of electrostatic capacitance, such as user's fingers, is essentially required. For a scanning infrared touch screen or a surface acoustic wave touch screen, the physical touch is not essentially required. Consequently, it is possible to avoid the damage of the surface of the touch screen. However, it is difficult to make such touch screens commercially available due to the high cost for manufacturing them.

Furthermore, since the above-mentioned touch screen technologies have been developed focusing on compact portable devices, and allow input to be sensed through physical touch or precise approach, it is difficult to employ such technologies even in a very short distance in a very confined space, such as in a small room. When a large display screen is employed, for example in a TeleVision (TV) set, it is difficult for a user to directly touch or precisely approach the TV screen whenever inputting is needed. Therefore, for a TV set or the like with a large display screen, there is a need in the art for a device and a method for allowing user input to be inputted with a touch screen method without any inconvenience.

SUMMARY OF THE INVENTION

Accordingly, the present invention has been made to solve the above-mentioned problems occurring in the prior art, and the present invention provides a remote control method in a remote control system including a display panel and a terminal for remote-controlling the display panel, and the remote control system.

According to the present invention, there is provided a remote control system including a terminal for receiving user input and transmitting a visible light signal to a point on the display screen of a display panel, and the display panel for executing an operation corresponding to the visible light signal received point on the display panel.

According to the present invention, there is provided a remote control method in a remote control system including a display panel and a terminal for remote-controlling the display panel, the method including receiving user input and transmitting a light signal, by the terminal, to a point on the display screen of the display panel, and executing an operation corresponding to the light signal received point by the display panel.

According to the present invention, there is provided a remote control method in a remote control system including a display panel and a terminal for remote-controlling the display panel, the method including generating a visible ray signal and transmitting a light signal to a point on the screen of the display panel, by the terminal, according to user input, receiving the light signal retroreflected from the display panel, the retroreflected light signal containing the positional information of the point on the screen, extracting the positional information of the point on the screen of the display panel from the retroreflected light signal, receiving a positional information request signal from the display panel, and retroreflecting a positional information response signal containing the positional information in response to the positional information request signal.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EMBODIMENTS

Figure 1:
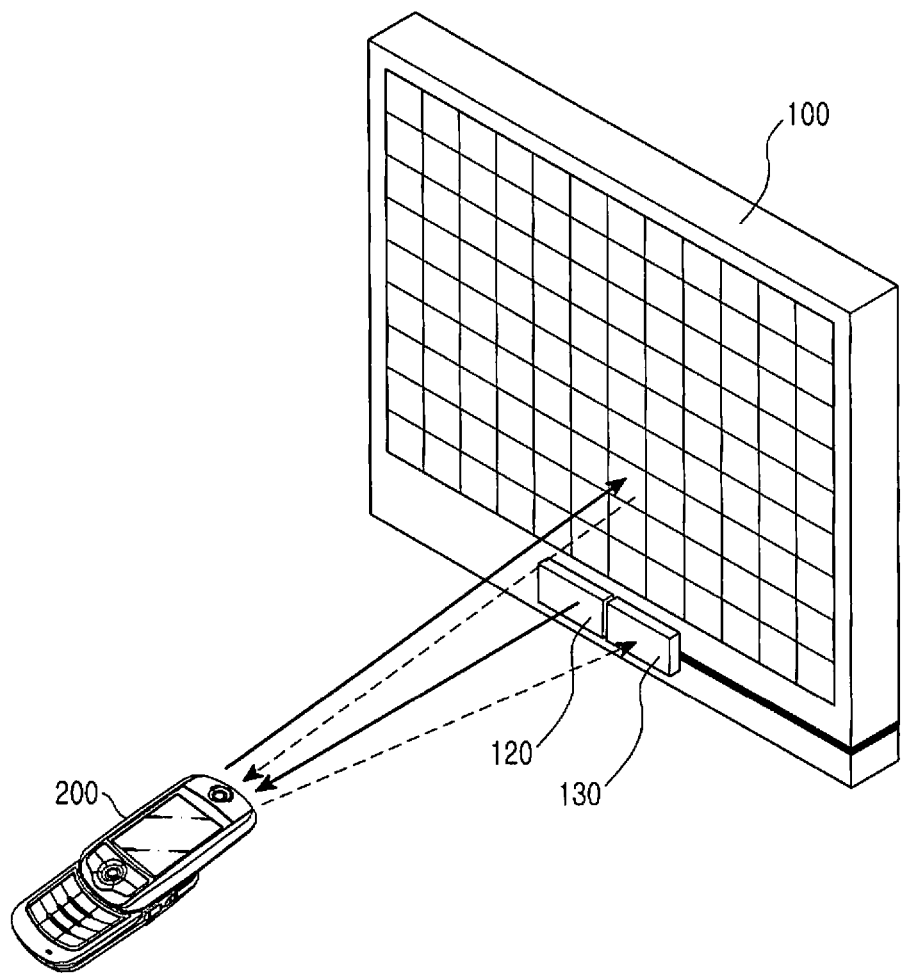
FIG. 1 illustrates a remote control system including a display panel and a terminal for remote-controlling the display panel in accordance with the present invention.

Hereinafter, embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted for the sake of clarity and conciseness.

FIG. 1 illustrates a remote control system including a display panel and a terminal for remote-controlling the display panel in accordance with the present invention.

The remote control system includes a display panel 100 and a mobile communication terminal 200.

The mobile communication terminal 200 may be a compact portable device having a function of transmitting/receiving an optical signal, such as a mobile communication terminal or a personal digital assistant (PDA).

The mobile communication terminal 200 receives user input, and outputs and transmits the user input in a visible light signal form to a point on the display screen of the display panel 100. As the mobile communication terminal 200 outputs the user input in the visible light signal form (hereinafter visible light signal), the user of the mobile communication terminal 200 can be directly aware of the item the user has selected on the display screen of the display panel. That is, the user can directly determine whether an operation desired by the user has been selected among the operations of the display panel 100.

At this time, the visible light signal may be outputted in a straight line form from the mobile communication terminal 200, whereby the visible light signal may appear in the form of a spot on the display screen of the display panel 100. The color, size and shape of the spot may be varied depending on one or more values previously stored in the mobile communication terminal 200, and may also be changed by the user input to the mobile communication terminal 200.

The display panel 100 has at least one retroreflector, so that the display panel 100 receives a visible light signal incident from an external visible light input device, i.e. a visible light signal outputted from the mobile communication terminal 200, and then retroreflects the visible light signal to the mobile communication terminal 200.

When retroreflecting the visible light signal to the mobile communication terminal 200 in this manner, the display panel 100 also transmits information regarding the point where the visible light signal outputted from the mobile communication terminal 200 has arrived, i.e. positional information, to the mobile communication terminal 200.

Then, the mobile communication terminal 200 stores the positional information received from the display panel 100, and a first light signal generating unit 120 of the display panel 100 generates and transmits a visible light signal or an infrared light signal to the mobile communication terminal 200. At this time, the display panel 100 requests the mobile communication terminal 200 to send the positional information. The mobile communication terminal 200 also has a retroreflector in the manner of the display panel 100. Thus, the mobile communication terminal 200 loads the positional information on the received visible or infrared light signal, and then transmits the signal to a first light signal receiving unit 130 of the display panel 100.

In the present embodiment, the display panel 100 indicates a device for outputting image signals, such as a large TV screen. In addition, although the means for receiving and outputting the user input in a visible light signal form was described with reference to the mobile communication terminal 200 in the present embodiment, it will be obvious to a person skilled in the art that beyond the mobile communication terminal 200, any device can be employed for the present invention if the device is mobile and able to transmit and receive light signals, such as visible or infrared light signals.

Figure 2:
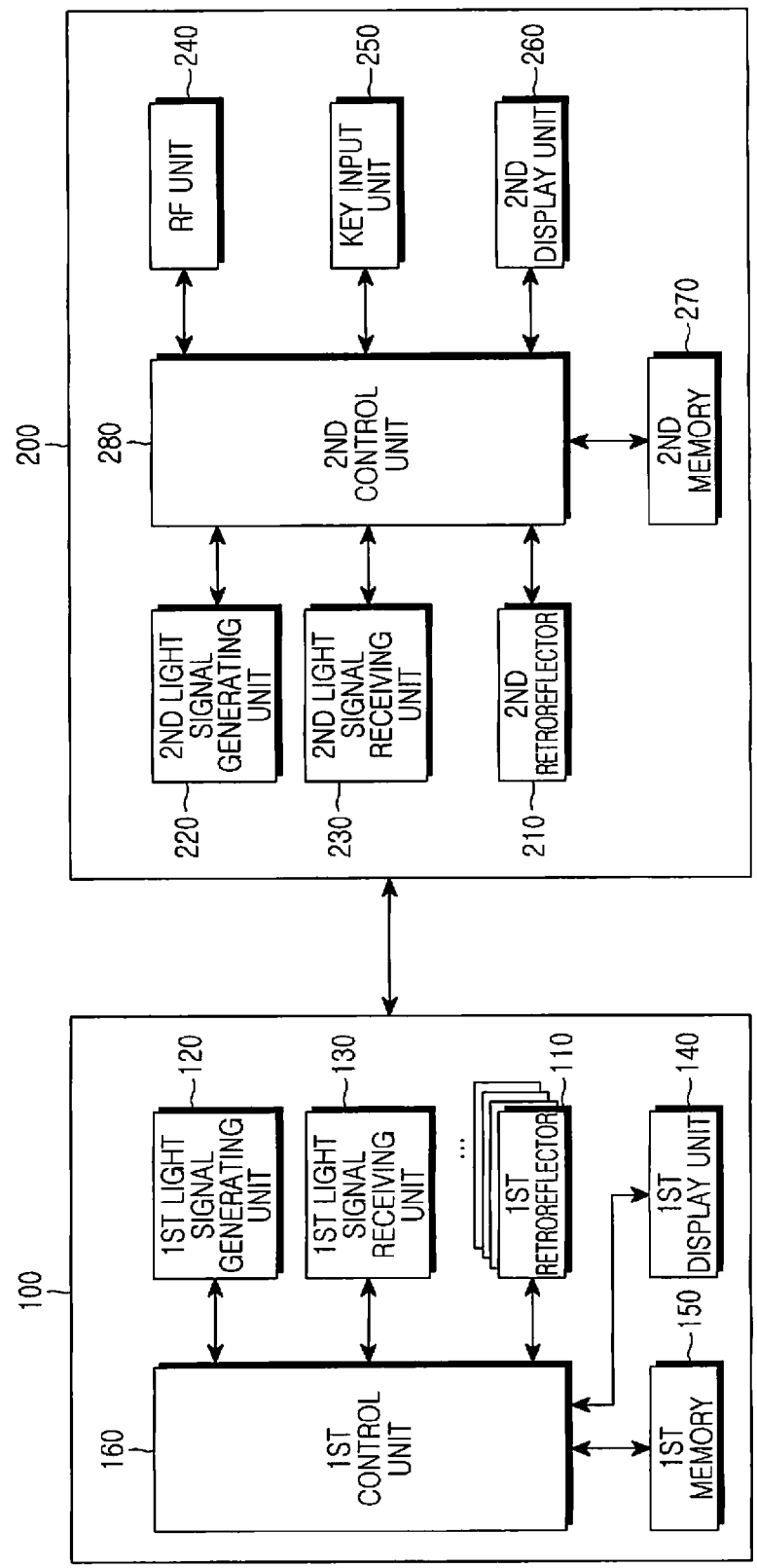
FIG. 2 illustrates a remote control system in accordance with the present invention.

FIG. 2 illustrates a remote control system in accordance with the present invention.

The display panel 100 includes at least one first retroreflector 110, a light signal generating unit 120, a light signal receiving unit 130, a first display unit 140, and a first control unit 160. The display panel 100 may further include a first memory 150.

The first retroreflector 110 has a property of reflecting light backward to the incident direction of the light. If a visible light signal is transmitted from the mobile communication terminal 200, the first retroreflector 110 of the display panel 100 retroreflects the visible light signal to the transmitted direction again. There may be provided a plurality of first retroreflectors 110 on the front face of the display panel 100.

The first retroreflectors 110 may be arranged in a plurality of sections of the front face of the display panel 100, and each of the first reflectors 110 may be designated with an IDentifier (ID). This will be described in detail below with reference to FIG. 4.

The first light signal generating unit 120 generates a positional information request signal. The first light signal generating unit 120 may generate the positional information signal in the form of visible light or infrared light produced under the control of the first control unit 160, and may transmit the positional information request signal to the mobile communication terminal 200. The first light signal generating unit 120 may include a message for requesting positional information to the positional information request signal transmitted to the mobile communication terminal 200 under the control of the first control unit 160 to be described below.

The positional information indicates the position of the point where a visible light signal has arrived on the display screen of the display panel before the first light signal generating unit 120 of the display panel 100 generates a positional information request signal, wherein the visible light signal is transmitted from the mobile communication terminal 200 to the display panel 100 so as to input a command. Preferably, since the plural first retroreflectors 110, each of which is assigned with an ID, are arranged on the front face of the display panel 100, among the first retroreflectors, the ID of the first retroreflector 110 positioned at the point where the visible light signal transmitted from the mobile communication terminal 200 has arrived will be the positional information according to the present embodiment.

More particularly, the first light signal generating unit 120 generates the positional information request signal in infrared light form. Since the positional information request signal and the positional information response signal corresponding to the positional information request signal are provided in infrared light form, it would be more aesthetically desired for the signals to be processed in such a manner that the user of the mobile communication terminal 200 cannot directly see the signals.

In addition, when the power source of the display panel 100 is turned on, the first light signal generating unit 120 may broadcast an initialization signal in a visible or infrared light form within a predetermined radius around the display panel 100. If the mobile communication terminal 200 exists within the area where the display panel 100 transmits the initialization signal, the mobile communication terminal 200 may transmit a response signal responding to the initialization signal to the display panel 100. In this manner, the mobile communication terminal 200 is capable of transmitting a command to be input to the display panel 100 in the form of a visible light signal, thereby delivering the command to the display panel 100.

In addition, the display panel 100 is capable of receiving a response signal of the mobile communication terminal 200 in response to the initialization signal, thereby recognizing the visible light signal transmitted from the mobile communication terminal 120 as an input signal. The display panel 100 receives the visible light signal transmitted from the mobile communication terminal 200 and recognized in this manner as a command, and performs an operation corresponding to the command.

The first light signal receiving unit 130 receives a visible or infrared light signal transmitted from the mobile communication terminal 200. If the mobile communication terminal 200 transmits a signal responding to the positional information request signal transmitted from the first light signal generating unit 120, i.e. a positional information response signal, the first light signal receiving unit 130 receives the positional information response signal, which includes positional information.

The first display unit 140 may be formed from a Liquid Crystal Display (LCD), for example. The first display unit 140 outputs various display data produced from the display panel 100 and is fabricated in a touch screen type, whereby the first display unit 140 can receive the visible light signal transmitted from the mobile communication terminal 200 as input.

The first memory 150 is stored with various data for controlling the display panel 100, and may be stored with the individual IDs of the first retroreflectors 110 arranged on the front face of the display panel 100, and commands respectively corresponding to the IDs.

The first control unit 160 controls the entire operation of the display panel 100. When a visible light signal is transmitted from the mobile communication terminal 200 and retroreflected by a first retroreflector 110, the first control unit 160 controls the first light signal generating unit 120 in such a manner that the first light signal generating unit 120 generates a positional information request signal.

In addition, if a positional information response signal is transmitted from the mobile communication terminal 200 through the second light signal receiving unit 230, the first control unit 160 analyzes the positional information contained in the positional information response signal. When the positional information is analyzed, the first control unit 160 determines a command corresponding to the positional information. In addition, the first control unit 160 controls the display panel 100 in such a manner that the display panel 100 executes the operation corresponding to the determined command.

The mobile communication terminal 200 may include a second retroreflector 210, a second light signal generating unit 220, a second light signal receiving unit 230, a Radio Frequency (RF) unit 240, a key input unit 250, a second display unit 260, a second memory 270, and a second control unit 280.

The second retroreflector 210 reflects an incident visible or infrared light signal backward to the incident direction of the light signal, in the manner of the first retroreflector 110 of the display panel 100. The second retroreflector 210 reflects a positional information request signal transmitted from the first light signal generating unit 120 backward to the display panel 100.

The second light signal generating unit 220 generates a visible light signal corresponding to the user input which is input through the key input unit 250, and transmits the visible light signal to the display panel 100. In addition, the second light signal generating unit 220 may generate a positional information response signal for responding to the visible light signal transmitted from the display panel 100 under the control of the second control unit 280. The second light signal generating unit 220 may load positional information on the positional information response signal under the control of the second control unit 280. The positional information response signal generated as described above is reflected backward in its incident direction, thereby being transmitted to the mobile communication terminal 200 through the second retroreflector 210.

The second light signal receiving unit 230 receives an initialization signal, and a visible light response signal or a positional information response signal transmitted from the display panel 100. The visible light response signal indicates a signal responding to the visible light signal transmitted to the display panel 100 from the second visible light generating unit 220. The visible light response signal may contain positional information.

Although the second retroreflector 210, the second light signal generating unit 220, and the second light signal receiving unit 230 were separately described as individual components in the present embodiment, they may be fabricated as a single component according to another embodiment.

The RF unit 240 executes the wireless communication function of the mobile communication terminal 200, and includes an RF transmitter (not shown) which frequency up-converts and amplifies a signal to be transmitted, and an RF receiver (not shown) which low-noise amplifies and frequency down-converts a received signal.

The key input unit 250 includes keys for inputting letters and numerical characters, and keys for setting various functions according to user input. The key input unit 250 according to the present embodiment may receive user input for transmitting a visible light signal to the display panel 100. In addition, the mobile communication terminal 200 may include control keys for remote-controlling the display panel 100. The user may provide user input through the control keys so as to set the mobile communication terminal 200 to remote-control the display panel 100. If the display panel 100 is fabricated as a remote-controllable touch screen, it is possible to transmit a signal for initializing the display panel 100 to the display panel so as to make the display panel operate as a remote touch screen, by providing input through the control keys of the mobile communication terminal 200.

The display unit 260 may be formed from an LCD or the like, and outputs various display data produced from the mobile communication terminal 200. If an LCD is fabricated in a touch screen type, the display unit 260 may be operated as an input means.

The memory 270 may be formed from a program memory or a data memory. The memory 270 is stored with various information items required for controlling the operation of the mobile communication terminal 200. The memory 270 according to the present embodiment stores positional information contained in a visible light response signal. The memory 270 according to another embodiment may temporarily store the information contained in the visible light response signal.

The second control unit 280 controls the entire operation of the mobile communication terminal 200. In particular, the second control unit 280 controls the second light signal generating unit 220 in such a manner that the second light signal generating unit 220 generates and transmits a visible light signal to the display panel 100. Alternatively, the second control unit 280 controls the second light signal receiving unit 230 in such a manner that the second light signal receiving unit 230 receives a visible light response signal or a positional information request signal. The second control unit 280 renders the positional information, which is contained in the visible light response signal received through the second light signal receiving unit, to be stored in the second memory 270. In addition, the second control unit 280 controls the second light signal receiving unit 230 in such a manner that the positional information is contained in the positional information response signal.

In addition, the second control unit 280 controls the second light receiving unit 230 so as to determine whether the signal responding to the visible light signal outputted from the second light signal generating unit 220 is received within the maximum time interval previously stored in the second memory 270. If the visible light signal is not received within the maximum time interval, the second control unit 280 may control the second display unit 260 in such a manner that the user can be notified from the second display unit 260 that it is difficult to execute remote control because the distance between the mobile communication terminal 200 and the display panel 100 is too long. In contrast, if the response signal is transmitted within a time interval shorter than the minimum time interval previously stored in the second memory 270, the user can be notified that it is difficult to execute remote control because the distance between the distance between the mobile communication terminal 200 and the display panel 100 is too short.

The second control unit 280 sets a color, a size and a shape of a spot formed by the visible light signal transmitted to the display panel 100, depending on one or more values previously stored in the mobile communication terminal 200, using the second light signal generating unit 220.

Figure 3:
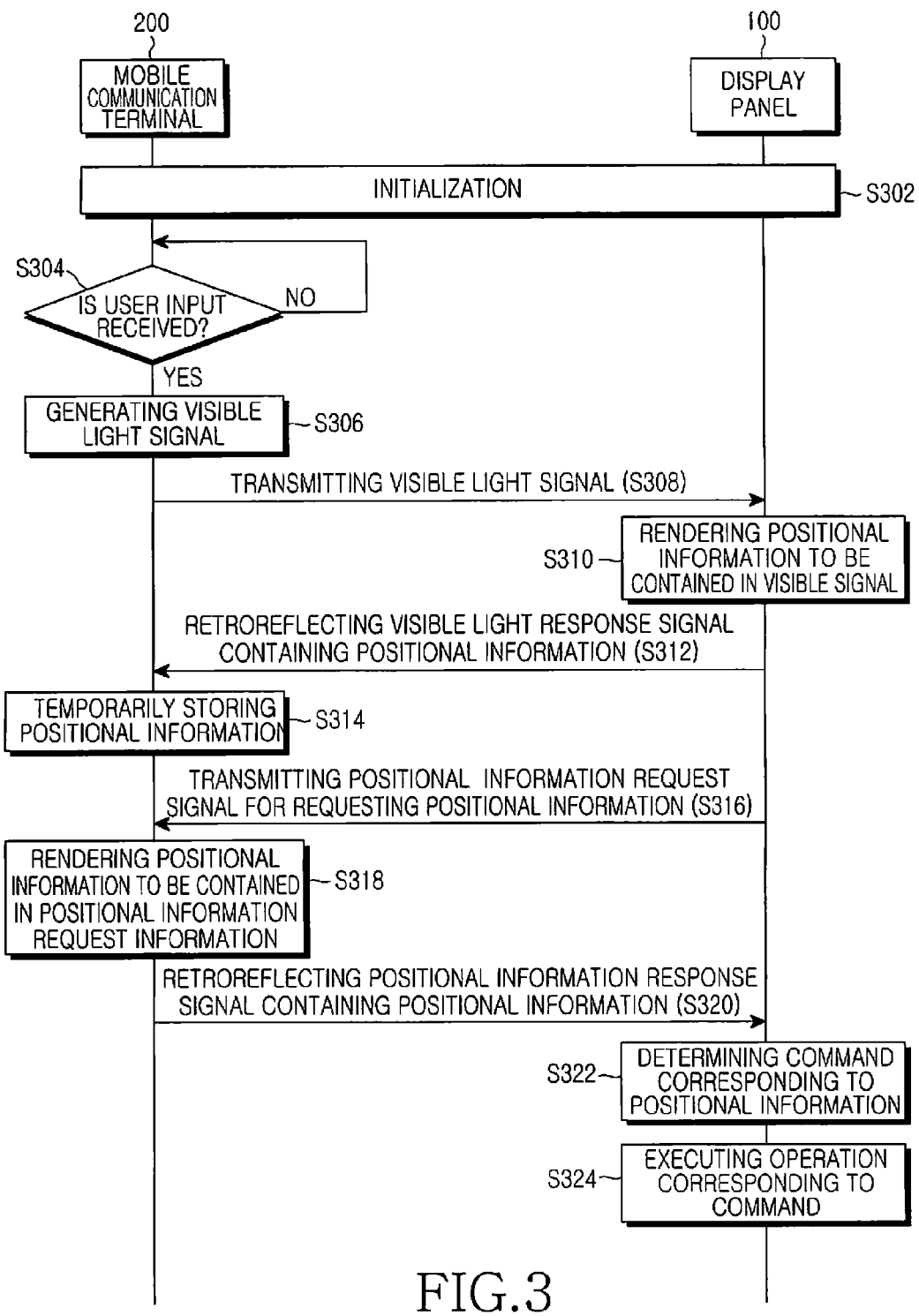
FIG. 3 illustrates a remote control method in a remote control system in accordance with the present invention.

FIG. 3 illustrates a remote control method in a remote control system in accordance with the present invention.

If the initialization between the display panel 100 and the mobile communication terminal 200 is completed at step S302, the second control unit 280 of the mobile communication terminal 200 determines whether user input has been received (S304). If the user input has not been received (S304: NO), the mobile communication terminal 200 remains in the standby condition.

The initialization between the display panel 100 and the mobile communication terminal 200 in the present embodiment indicates a process for preparing the mobile communication terminal 200 to transmit a visible light signal to the display panel 100, and for making the display panel 100 perform the operation according to the visible light signal received from the mobile communication terminal 200.

If the user input is received through the key input unit 250 of the mobile communication terminal 200, at step S304: YES, the second light signal generating unit 220 generates a visible light signal at step S306. The second control unit 280 controls the second light signal generating unit 220 in such a manner that the second light signal generating unit 220 transmits the visible light signal. At this time, by adjusting the position of the mobile communication terminal 200, the user can determine the point where the visible light signal outputted from the mobile communication terminal 200 arrives on the display panel 100.

If the visible light signal is transmitted from the mobile communication terminal 200, the corresponding first retroreflector 110 provided on the front face of the display panel 100 loads the positional information regarding the visible light signal arriving point on the visible light signal at step S310.

The first control unit 160 of the display panel 100 according to another embodiment may determine whether the visible light signal transmitted from the mobile communication device 200 continuously arrives at the same point over a time interval previously stored in the first memory 150. The first control unit 160 may recognize the visible light signal as input only when the visible light signal arrives at the same point over the time interval previously stored in the first memory 150.

For example, if the time interval the visible light signal continuously arrives at the display panel 100 should be 0.5 seconds or more, the mobile communication device 200 should continuously transmit the visible light signal for 0.5 seconds or more.

Herein, the 'same point' corresponds to a spot formed by the visible light signal arriving at the front face of the display panel. However, if the visible light signal continuously arrives at plural points within an area previously stored in the first memory 150 (for example, the area may be an area of one retroreflector having a particular ID in a display panel) all the points where the corresponding visible light arrives may be considered as the 'same point.'

The first visible light generating unit 120 of the display panel 100 retroreflects the positional information response signal containing positional information to the mobile communication terminal 200 through the first retroreflector 110 at step S312. The mobile communication terminal 200 temporarily stores the positional information contained in the positional information response signal transmitted from the display panel 100 in the second memory 270 at step S314.

The first control unit 160 of the display panel 100 controls the first light signal generating unit 120 so that a positional information request signal for requesting positional information is transmitted to the mobile communication terminal 200 at step S316. The mobile communication terminal 200 receives the positional information request signal from the display panel 100, and the second light signal generating unit 230 loads the positional information on the positional information request signal under the control of the second control unit 280 at step S318. The mobile communication terminal 200 controls the second light signal generating unit 220 in such a manner that the positional information response signal containing the positional information is retroreflected to the display panel 100 at step S320.

As a result, the display panel 100 can be aware of the point where the visible light signal outputted from the mobile communication terminal 200 has arrived on the display panel 100 by receiving the positional information response signal containing the positional information. The first control unit 160 analyzes the positional information contained in the positional information response signal, and determines the command corresponding to the positional information at step S322. In addition, if the command corresponding to the positional information is determined, the first control unit 160 controls the display panel 100 in such a manner that the operation corresponding to the command is executed at step S324.

Figure 4:
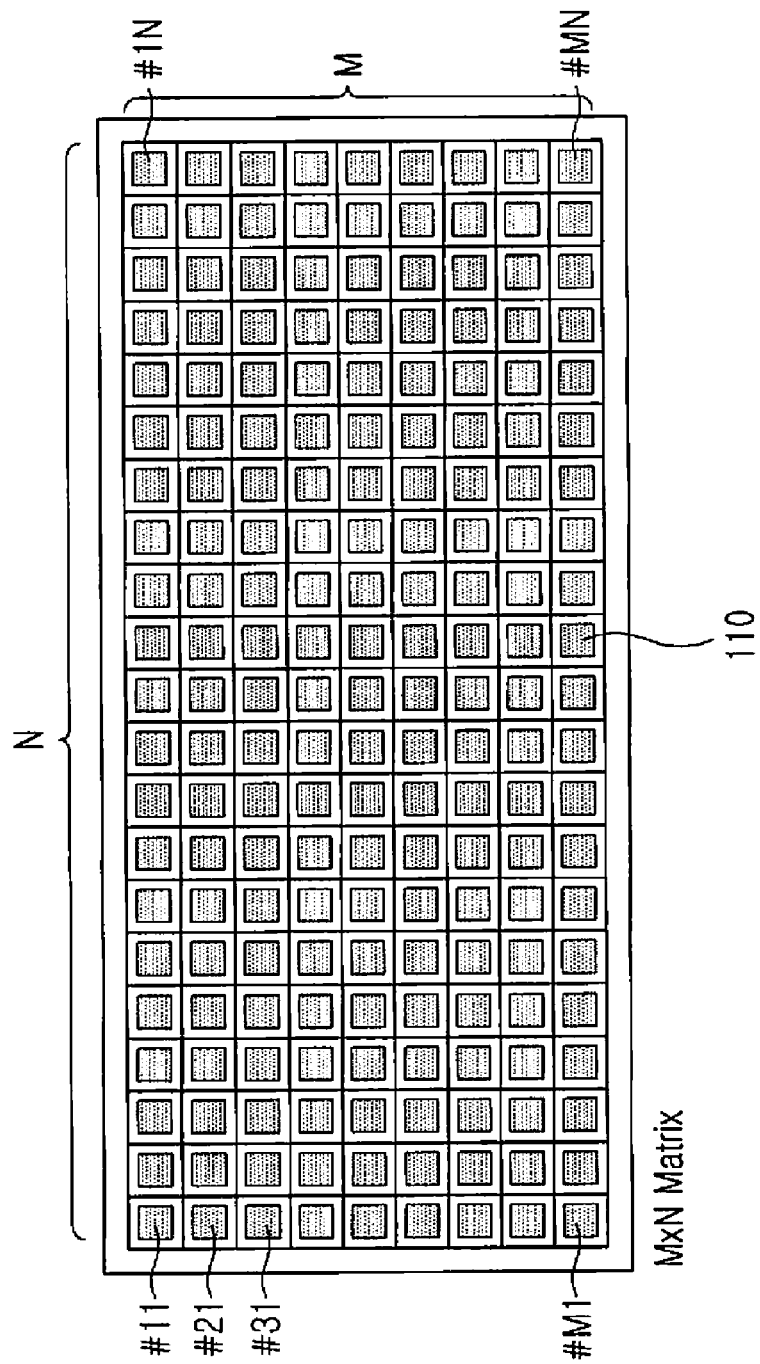
FIG. 4 illustrates a retroreflector provided in a display panel in a remote control system in accordance with the present invention.

FIG. 4 illustrates a retroreflector provided in a display panel in a remote control system in accordance with an embodiment of the present invention.

Referring to FIG. 4, the front face of the display panel 100 is provided with M×N retroreflectors, each of which having a unique ID. The retroreflectors shown in FIG. 4 are assigned IDs in the form "#MN," respectively. The ID of the retroreflector positioned at the top of the leftmost column is "#11," and the retroreflectors, which have IDs, "#21," "#31," "#41," . . . , "#M1," respectively, are sequentially arranged below the retroreflector of ID, #11. In the same manner with the retroreflectors positioned at the leftmost column, the retroreflectors positioned at the top row, which have IDs, "#11," "#12," "#13," "#14," . . . , "#1N," respectively, are sequentially arranged from the leftmost retroreflector.

Meanwhile, although the above-mentioned IDs may be unique values which are individually assigned to the retroreflectors included in the group of the first retroreflectors 110, the IDs may be optionally defined by the first control unit 160 depending on the sequence arranged on the display panel 100.

In addition, each of the retroreflectors of the display panel 100 according to the present embodiment may have a unique ID and a command corresponding to the ID. For example, the command corresponding to the retroreflector #42 may be "STOP." In such a case, if the visible light signal outputted from the mobile communication terminal 200 arrives at a point on the retroreflector #42, the display panel 100 performs the operation corresponding to the command "STOP."

According to the present invention, there are provided a remote control method in a remote control system including a display panel and a terminal for remote-controlling the display panel, and the remote control system.

In addition, a user is allowed to input a command to the display panel in a touch screen method even at a long distance by using the terminal, and the display panel is capable of executing an operation desired by the user according to a visible light signal outputted from the terminal.

Furthermore, since the visible light is outputted from the terminal, the user can directly determine what operation is selected by the user through the terminal, whereby the user is allowed to control the display panel in such a manner that only the operation desired and selected by the user can be executed by the display panel.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for remote-controlling a display panel by a terminal, the display panel having a screen provided with retroreflectors for reflecting received light to an incident direction of the light, the method comprising the steps of:
    transmitting a light signal to a point on the screen of the display panel according to user input;
    receiving the light signal retroreflected from the display panel, the retroreflected light signal including positional information of the point on the screen;
    extracting the positional information of the point on the screen of the display panel from the retroreflected light signal;
    receiving a positional information request signal from the display panel; and
    retroreflecting a positional information response signal including the positional information in response to the positional information request signal.

2. The method as claimed in claim 1, wherein the display panel receives the positional information response signal, determines a command corresponding to the positional information, and executes an operation corresponding to the command.

3. The method as claimed in claim 1, wherein the terminal changes an incident angle of the light signal incident to the screen of the display panel, the color of the light signal, and a size of a spot formed by the light signal transmitted to the point according to the user input.

4. The method as claimed in claim 1, wherein the terminal sets a color, a size and a shape of a spot formed by the light signal transmitted to the point, depending on one or more values previously stored in the terminal.

5. The method as claimed in claim 1, further comprising storing the extracted positional information of the point on the screen of the display panel in a memory.

6. The method as claimed in claim 1, wherein the terminal is a compact portable device having a function of transmitting/receiving an optical signal, such as a mobile communication terminal or a personal digital assistant.

7. The method as claimed in claim 1, wherein the terminal displays various display data including user input.

8. A terminal for remote-controlling a display panel having a screen provided with retroreflectors for reflecting received light to the incident direction of the light, the terminal comprising:
    a retroreflector for retroreflecting received light to the incident direction of the light;
    a light signal generating unit for transmitting a light signal to a point on the screen of the display panel according to user input;
    a light signal receiving unit for receiving the light signal retroreflected from the display panel, the retroreflected light signal including the positional information of the point on the screen, wherein the light signal receiving unit also receives a positional information request signal for requesting the positional information from the display panel; and
    a control unit for extracting the positional information of the point on the screen of the display panel from the retroreflected light signal, wherein the control unit renders a light signal including the positional information to be retroreflected through the retroreflector in response to the positional information request signal.

9. The terminal as claimed in claim 8, further comprising a RF unit for executing the wireless communication function of the terminal.

10. The terminal as claimed in claim 8, wherein the terminal changes an incident angle of the light signal incident to the screen of the display panel, the color of the light signal, and a size of a spot formed by the light signal transmitted to the point according to the user input.

11. The terminal as claimed in claim 8, wherein the control unit sets a color, a size and a shape of a spot formed by the light signal transmitted to the point, depending on one or more values previously stored in the terminal, using the light signal generating unit.

12. The terminal as claimed in claim 8, further comprising a memory for storing the extracted positional information of the point on the screen of the display panel.

13. The terminal as claimed in claim 8, wherein the terminal is a compact portable device having a function of transmitting/receiving an optical signal, such as a mobile communication terminal or a personal digital assistant.

14. The terminal as claimed in claim 8, further comprising a display unit for displaying various display data including user input.

15. The terminal as claimed in claim 8, further comprising a key input unit for receiving the user input, wherein the light signal generating unit changes an incident angle of the light signal incident to the screen of the display panel, the color of the light signal, and a size of a spot formed by the light signal transmitted to the point according to the user input.

16. A display panel for controlling a terminal comprising:
    one or more first retroreflectors for retroreflecting a response signal responding to a light signal received from the terminal;
    a first light signal generating unit for loading positional information for a point on a screen of the display panel where the light signal is received, the first light signal generating unit generating and transmitting a positional information request signal for requesting the positional information to the terminal;
    a first light signal receiving unit for receiving a positional information response signal from the terminal in response to the positional information request signal; and a control unit for determining and executing a command corresponding to the positional information when the positional information response signal is received, wherein each of the plurality of first retroreflectors has a unique IDentifier (ID), and the plurality of first retroreflectors are arranged on the screen of the display panel in a rectangular form with a predetermined size.

17. The display panel as claimed in claim 16, wherein each of the plurality of first retroreflectors has a command corresponding to the ID thereof.

18. The display panel as claimed in claim 16, wherein the terminal comprises:

a second light signal receiving unit for receiving the positional information request signal; and a second light signal generating unit for generating and transmitting the light signal to the retroreflectors, the second light signal generating unit generating and transmitting the positional information response signal to the second light signal generating unit if the positional information request signal is received.

19. The display panel according to claim 18, wherein the second light signal generating unit reflects the positional information response signal at an incident angle of the positional information request signal, thereby transmitting the positional information response signal to the terminal.

20. The display panel according to claim 18, wherein the terminal further comprises a key input for receiving the user input, wherein the second light signal generating unit changes an incident angle of the light signal incident to the screen of the display panel, the color of the light signal, and a size of a spot formed by the light signal transmitted to the point according to the user input.

* * * * *